(12) United States Patent
Shibasaki

(10) Patent No.: US 8,342,694 B2
(45) Date of Patent: Jan. 1, 2013

(54) PROJECTION APPARATUS, METHOD, AND PROGRAM FOR ADJUSTING A BRIGHTNESS OF A LIGHT SOURCE SO THAT A CALCULATED CHROMATICITY INDICATING BRIGHTNESS BECOMES A TARGET CHROMATICITY

(75) Inventor: Mamoru Shibasaki, Tachikawa (JP)

(73) Assignee: Casio Computer Co., Ltd., Tokyo (JP)

( * ) Notice: Subject to any disclaimer, the term of this patent is extended or adjusted under 35 U.S.C. 154(b) by 542 days.

(21) Appl. No.: 12/616,968

(22) Filed: Nov. 12, 2009

(65) Prior Publication Data

US 2010/0128226 A1 May 27, 2010

(30) Foreign Application Priority Data

Nov. 27, 2008 (JP) ................................. 2008-302740
Oct. 20, 2009 (JP) ................................. 2009-241497

(51) Int. Cl.
*G03B 21/20* (2006.01)
(52) U.S. Cl. ............. 353/85; 353/31; 348/687; 362/552
(58) Field of Classification Search .................... 353/31, 353/85, 119, 122, 121; 348/687; 362/552
See application file for complete search history.

(56) References Cited

U.S. PATENT DOCUMENTS

| | | | |
|---|---|---|---|
| 6,801,365 B2 | 10/2004 | Nakamura et al. | |
| 7,052,138 B2 | 5/2006 | Matsui | |
| 7,436,386 B2 | 10/2008 | Ishiguchi | |
| 7,857,466 B2 | 12/2010 | Inoue et al. | |
| 2004/0227456 A1* | 11/2004 | Matsui | 313/501 |
| 2005/0094110 A1* | 5/2005 | Nakamura | 353/85 |
| 2005/0162619 A1* | 7/2005 | Hamaya | 353/69 |
| 2006/0170883 A1 | 8/2006 | Matsui | |

FOREIGN PATENT DOCUMENTS

| | | |
|---|---|---|
| JP | 2003-174651 A | 6/2003 |
| JP | 2004-184852 A | 7/2004 |
| JP | 2004-198320 A | 7/2004 |

(Continued)

OTHER PUBLICATIONS

Japanese Office Action dated Nov. 2, 2010 (and English translation thereof) in counterpart Japanese Application No. 2009-241497.

(Continued)

*Primary Examiner* — Francis M Legasse, Jr.
(74) *Attorney, Agent, or Firm* — Holtz, Holtz, Goodman & Chick, PC

(57) ABSTRACT

A projection apparatus includes a plurality of light sources individually emitting light in a plurality of colors, a projection section using light from the light sources to generate images corresponding to respective plural color components of the light source light for each period, to sequentially project the images, a measurement section measuring a brightness of the light sources for each of the plurality of colors, an average brightness calculation section calculating, at each image projection term for the same color component, an average brightness of the brightness measured by the measurement section at the image projection term, and a light source control section adjusting the brightness of the light sources so that an average chromaticity based on the average brightness calculated by the average brightness calculation section and indicating the brightness is equal or approximate to a target chromaticity.

13 Claims, 5 Drawing Sheets

FOREIGN PATENT DOCUMENTS

| | | |
|---|---|---|
| JP | 2004-317558 A | 11/2004 |
| JP | 2004-341206 A | 12/2004 |
| JP | 2006-330177 A | 12/2006 |
| JP | 2007-065012 A | 3/2007 |
| JP | 2008-079113 A | 4/2008 |
| JP | 2008-116914 A | 5/2008 |
| JP | 2008-177049 A | 7/2008 |
| JP | 2008-192421 A | 8/2008 |
| JP | 2010-152326 A | 7/2010 |

OTHER PUBLICATIONS

U.S. Appl. No. 13/431,462; First Named Inventor: Mamoru Shibasaki; Title: "Projection Apparatus, Projection Method, and Program Storing Program"; filed Mar. 27, 2012.

Japanese Office Action dated Jan. 25, 2011 (and English translation thereof) in counterpart Japanese Application No. 2009-241497.

* cited by examiner

PROJECTION APPARATUS, METHOD, AND PROGRAM FOR ADJUSTING A BRIGHTNESS OF A LIGHT SOURCE SO THAT A CALCULATED CHROMATICITY INDICATING BRIGHTNESS BECOMES A TARGET CHROMATICITY

CROSS-REFERENCE TO RELATED APPLICATIONS

This application is based upon and claims the benefit of priority from prior Japanese Patent Applications No. 2008-302740, filed Nov. 27, 2008; and No. 2009-241497, filed Oct. 20, 2009, the entire contents of both of which are incorporated herein by reference.

BACKGROUND OF THE INVENTION

1. Field of the Invention

The present invention relates to a projection apparatus, a projection method, and a program which are suitable for a projector apparatus or the like.

2. Description of the Related Art

Various projector apparatuses have been commercially available which use a scheme called a field sequential scheme to enable color images in a plurality of colors to be visually perceived by switching the images at a high speed to consecutively project the images.

In particular, for projector apparatuses of this kind which use LEDs as a light source, a technique can be used which simultaneously lights LEDs in a plurality of colors, R (red), G (green), and B (blue), which serve as a light source, in order to ensure a sufficient quantity of light.

FIG. 5 illustrates the emission luminance of each of the color LEDs obtained when one image frame is divided into three fields to project the respective RGB color images. FIG. 5(A) shows timings (fields) when for example, an LCD panel or a micromirror element forming optical images forms color images.

For example, in the R field, a red LED-R shown in FIG. 5(B) can emit light at a high current value. At the same time, a green LED-G shown in FIG. 5(C) and a blue LED-B shown in FIG. 5(D) can emit light at a preset low current value. The resulting mixed light forms a red optical image.

FIG. 6 is a CIExy chromaticity diagram illustrating a comparison of a chromaticity set when such multicolor LEDs as described above are simultaneously driven to emit light, with a chromaticity set when a single-color LED is lit. In FIG. 6, a horseshoe shape indicates a human visible region V. Furthermore, dashed lines and circles at vertex positions show the range of the chromaticity set by the single-color LED. On the other hand, solid lines and triangles at vertex positions show the range of the chromaticity set by the multicolor LEDs.

LEDs have a property wherein not only luminance but also chromaticity varies with the value of a supplied current. Thus, when the apparatus actually operates, if LEDs in three colors are made to emit light, for example, in an R field of one frame, the resulting mixed light has an unexpected chromaticity owing to the above-described property.

If the chromaticity of the light source varies in at least one of the R, G, and B fields, the chromaticity in one frame as a whole may also vary. This prevents projection from being achieved at the correct chromaticity.

As described above, an object of the present invention is to provide a projection apparatus, a projection method, and a program which enable the chromaticity of light source light according to the field sequential scheme to be accurately maintained at a set content.

BRIEF SUMMARY OF THE INVENTION

A preferred embodiment of the present invention includes:
a plurality of light sources individually emitting light in a plurality of colors;
a projection section using light from the light sources to generate images corresponding to respective plural color components of the light source light for each period, to sequentially project the images;
a measurement section measuring a brightness of the light sources for each of the plurality of colors at a term at which the projection section projects an image of each of the plural color components;
an average brightness calculation section calculating, at each image projection term for the same color component, an average brightness of the brightness measured by the measurement section at the image projection term; and
a light source control section adjusting the brightness of the light sources so that an average chromaticity based on the average brightness calculated by the average brightness calculation section and indicating the brightness is equal or approximate to a target chromaticity.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

The best mode for carrying out the present invention will be described below with reference to the drawings. However, the embodiment described below involves various limitations that are technically preferred for carrying out the present invention. However, the limitations are not intended to limit the scope of the present invention to the following embodiment and illustrated examples.

An embodiment of the present invention will be described with reference to the drawings.

Figure 1:
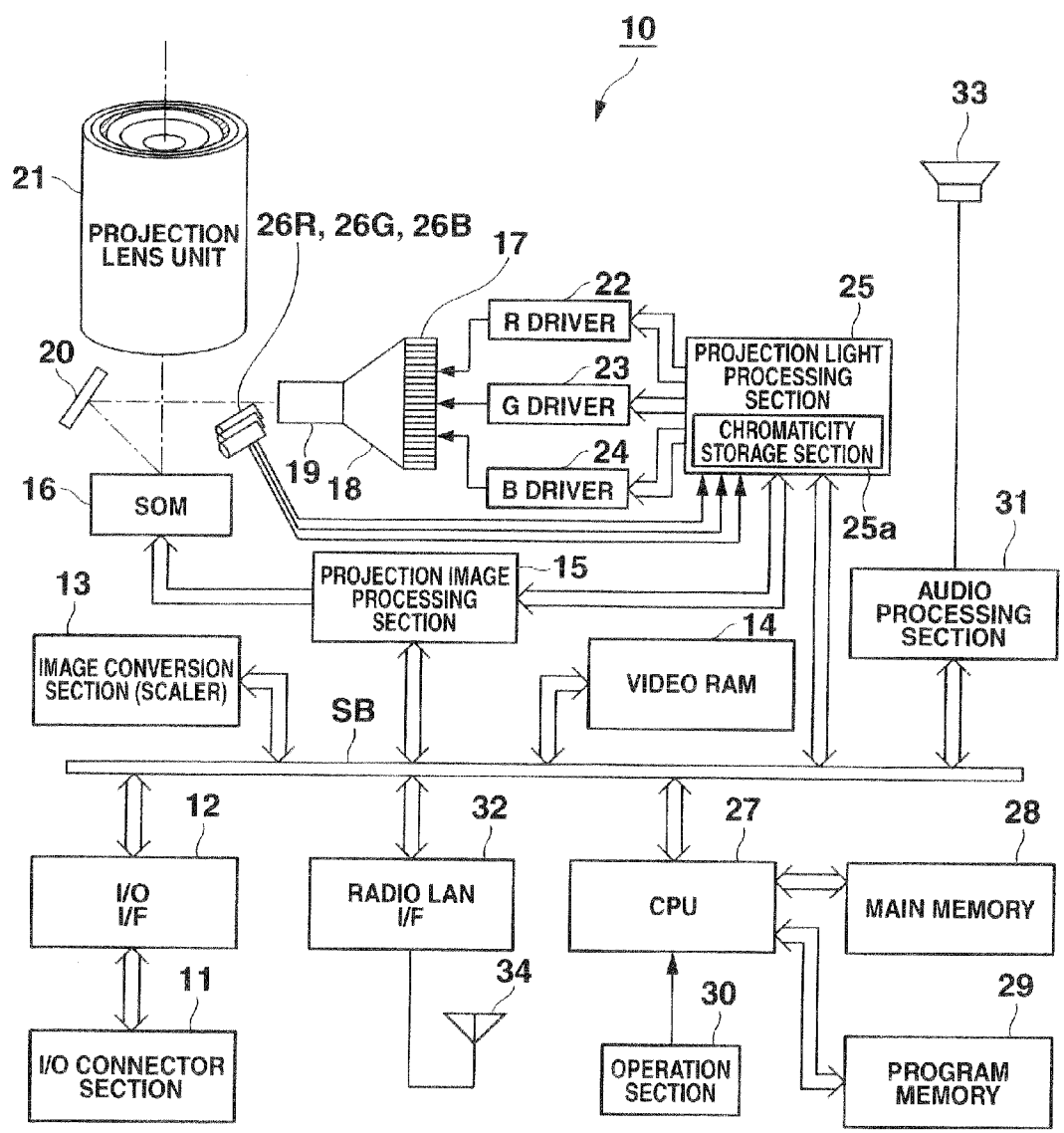
FIG. 1 is a block diagram showing the general configuration of a functional circuit in a projector apparatus according to the present embodiment.

FIG. 1 is a block diagram showing the general functional configuration of an electronic circuit included in a data projector apparatus 10 according to the embodiment.

An I/O connector section 11 includes, for example, a pin jack (RCA) type video input terminal, a D-sub 15 type RGB input terminal, and a USB (Universal Serial Bus) connector.

Image signals according to various standards input through the I/O connector section 11 are input, via an I/O interface (I/F) 12 and a system bus SB, to an image conversion section 13, generally called a scaler. The image conversion section 13, integrally converts the input image signals into a predetermined format suitable for projection. The image conversion section 13 appropriately stores the image signals in a video RAM 14 that is a buffer memory for display and then feeds the image signals to a projection image processing section 15.

At this time, data such as symbols which indicates operational statuses for OSD (On Screen Display) is superimposed on the image signals by the video RAM 14. The processed image signals are fed to the projection image processing section 15.

The projection image processing section 15 drives a micromirror element 16, which is a spatial optical modulating element (SOM), so that the micromirror element 16 provides display, using faster time division driving in which a frame rate according to a predetermined format, for example, 60 [frames/sec.], the number of color components resulting from division, and the number of display gray levels are multiplied together, according to the fed image signals.

The micromirror element 16 performs a quick on/off operation on the inclination of each of a plurality of arrayed micromirrors which, for example, correspond to XGA (1,024×768 dots). The micromirror element 16 then forms reflected light from the micromirrors into an optical image.

On the other hand, an LED array 17 is used as a light source for the present data projector apparatus 10. In the LED array 17, a large number of LEDs emitting light in colors R, G, and B are regularly mixed together in an array form. Light with each color component emitted in a time division manner is condensed by a pyramidal housing 18 in which a reflection mirror is stuck to the entire inner surface of the housing. An integrator 19 then forms the light into a flux with an even luminance distribution. A mirror 20 then totally reflects the flux. The micromirror element 16 is thus irradiated with the reflected flux.

An optical image formed by reflected light from the micromirror element 16 is projected and displayed on a screen (not shown in the drawings) serving as a projection target, via a projection lens unit 21.

In the LED array 17, an R driver 22, a G driver 23, and a B driver 24 drivingly controls LED groups with corresponding colors so that light in the primary colors R, G, and B is emitted in a time division manner.

The R driver 22, the G driver 23, and the B driver 24 drive the LED groups with the respective color components forming the LED array 17, at timings and driving currents based on a control signal from a projection light processing section 25.

The projection light processing section 25 controls the light emission timings and the driving currents for the R driver 22, the G driver 23, and the B driver 24 according to image data provided by the projection image processing section 15. Moreover, the projection light processing section 25 receives detection signals from illuminance sensors 26R, 26G, and 26B detecting the brightness of the respective colors of an optical image formed by the micromirror element 16.

The projection light processing section 25 includes a chromaticity storage section 25a storing the brightness detected by the illuminance sensors 26R, 26G, and 26B and the current light emission current values of the LEDs, as information indicative of chromaticity.

CPU 27 controls all the operations of the above-described circuits. CPU 27 is connected to a main memory 28 and a program memory 29. The main memory 28 is composed of DRAM and functions as a work memory. The program memory 29 is composed of an electrically rewritable nonvolatile memory storing operation programs, various routine data, and the like. CPU 27 uses the main memory 28 and the program memory 29 to perform control operations in the data projector apparatus 10.

CPU 27 described above performs various projection operations according to key operation signals from an operation section 30. The operation section 30 includes a key operation section provided in the main body of the data projector apparatus 10, and a laser light receiving section receiving infrared light from a remote controller (not shown in the drawings) dedicated to the data projector apparatus 10. Key operation signals based on keys operated by a user directly or via the remote controller are output directly to CPU 27.

CPU 27 is further connected to an audio processing section 31 and a radio LAN interface (I/F) 32 via the above-described system bus SB.

The audio processing section 31 includes a sound source circuit such as a PCM sound source. The audio processing circuit 31 converts audio data provided for a projection operation into analog data and drives a speaker section 33 to amplify the data and emit a corresponding sound. Alternatively, the audio processing section 31 generates a beep sound or the like as required.

The radio LAN interface 32 transmits and receives data, via a radio LAN antenna 34, to and from a plurality of external devices including a personal computer, for example, using a radio wave in a 2.4 [GHz] band according to the IEEE 802.11 b/g standard.

Now, the operation of the above-described embodiment will be described.

Figure 2:
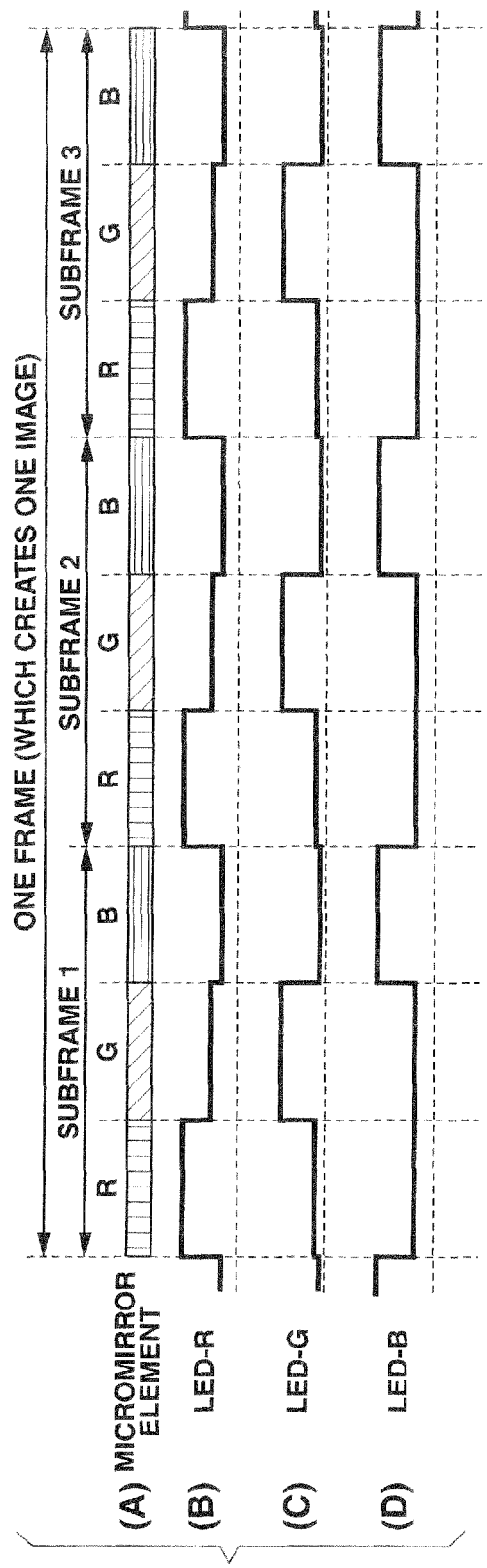
FIG. 2 is a timing chart showing how the light emission of light sources according to the present driven.

In the present embodiment, the data projector 1 divides one frame shown in FIG. 2 into three subframes; a first subframe, a second subframe, and a third subframe. Then, the data projector 1 sequentially and repeatedly projects color images in the R, G, and B fields, respectively, in each subframe.

FIG. 2(A) shows timings at which the above-described micromirror element 16 enables optical images to be formed by the color images in the R, G, and B fields. Furthermore, FIG. 2(B) to 2(D) show current driving values for the LED array 17 lit in synchronism with the above-described R, G, and B fields.

For example, in the B field of each subframe, the projector 1 makes the red LED-R emit light at a high current value as shown in FIG. 2(B). In addition, the projector 1 allows the green LED-G shown in FIG. 2(C) and the blue LED-B shown in FIG. 2(D) to emit light at respective low current values. As a result, a red optical image is formed using the resulting mixed light in R, G, and B.

Further, in the G field and the B field, the LEDs in the three colors are simultaneously made to emit light as required, to form a green optical image and a blue optical image using the resulting mixed light.

Figure 3:
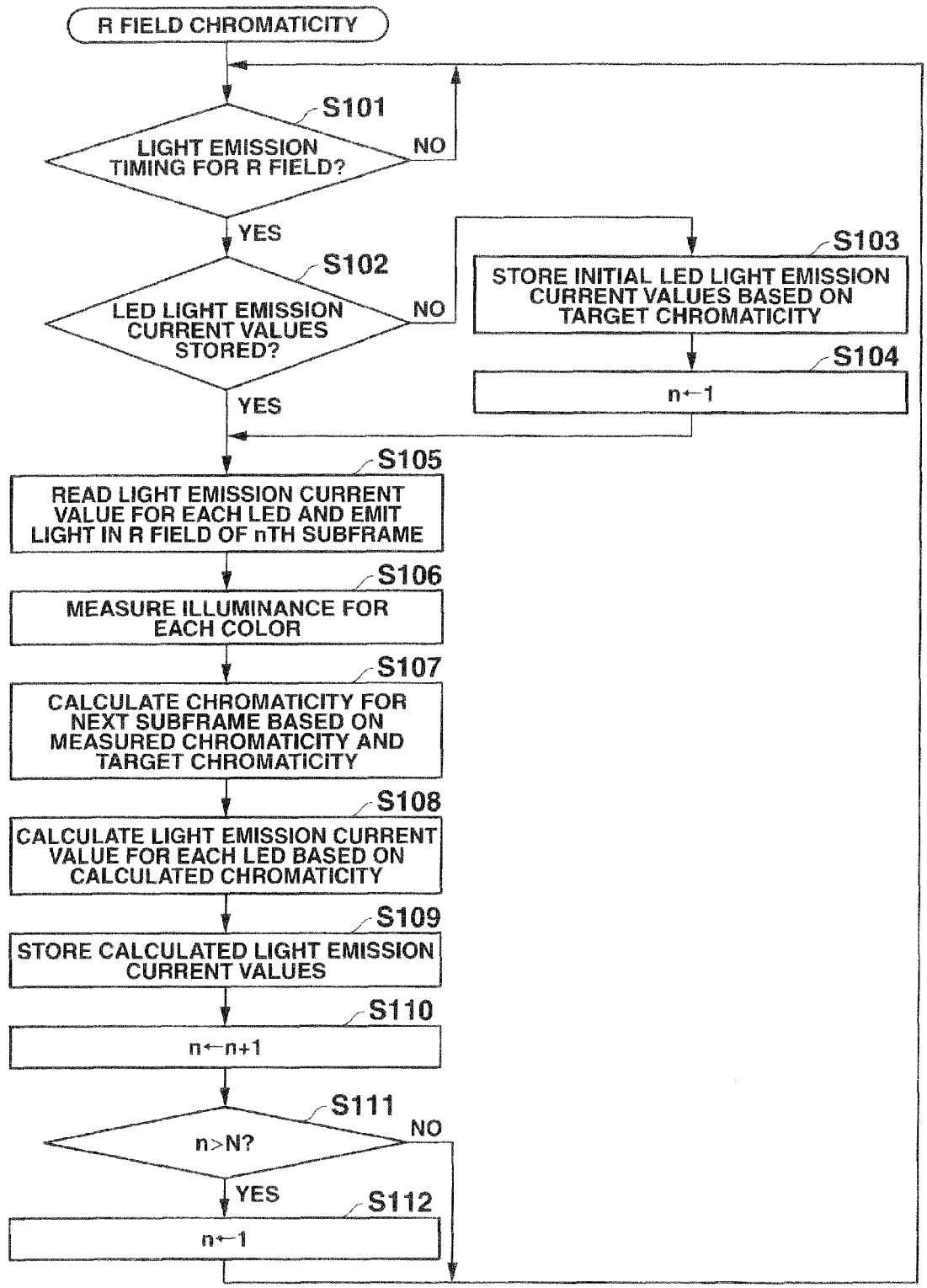
FIG. 3 is a flowchart showing how the light emission of the light sources according to the present embodiment, particularly for an R field, is driven.

FIG. 3 shows how processing is executed to adjust the chromaticity in each subframe of each frame, particularly in the R field. In the processing, basically, the operation programs stored in the program memory 29 are expanded and stored in the main memory 28 so that CPU 27 executes the operation programs. Then, under the control of CPU 27, the projection light processing section 25 drivingly controls the R driver 22, the G driver 23, and the B driver 24.

Similar operations are also performed on the G field and the B field. However, for simplification of description, only the operation on the R field will be described.

First, CPU 27 waits for a timing for lighting in the R field (step S01). Then, upon determining that the timing has been reached, CPU 27 determines whether or not current values required to enable the R, G, and B LEDs, respectively, of the LED array 17 to emit light are stored in the chromaticity storage section 25*a* of the projection light processing section 25 (step S02). In other words, the projection light processing section 25 determines whether or riot the timing corresponds to light emission in the R field of the second or third subframe of the image frame.

Here, if the light emission current values are riot stored in the chromaticity storage section 25*a* yet, CPU 27 determines that the light emission timing corresponds to the R field in the first subframe. Then, CPU 27 stores the initial light emission current values for the LEDs based on a preset target chromaticity in the chromaticity storage section 25*a* (step S103). Thereafter, a variable (n) indicating the number of subframes is set to an initial value "1" (step S104).

Then, CPU 27 reads the light emission current values for the color LEDs of the LED array 17 stored in the chromaticity storage section 25*a*. Then, in the nth subframe corresponding to the current variable (n) (that is, here, the first subframe), CPU 27 uses the R driver 22, the G driver 23, and the B driver 24 to drive the LED array 17 at the read light emission current values so that the LED array 17 emits light (step S105).

According to light emission from the LED array 17, CPU 27 makes the illuminance sensors 26R, 26G, and 26B measure the brightness of the respective color components of the light source light (step S106). Based on the measured brightness of the respective colors, CPU 27 calculates the total chromaticity in the R field of the first subframe. Then, based on the differential value between the calculated total chromaticity and the target chromaticity, CPU 27 calculates a chromaticity for lighting in the R field of the next subframe (step S107).

Figure 4A:
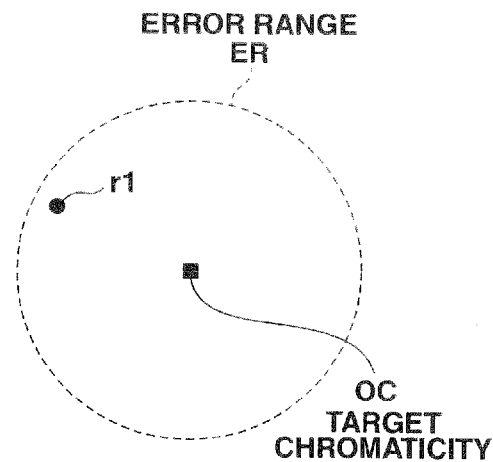
FIG. 4A to FIG. 4E are diagrams illustrating the transition state of light emission and chromaticity determination for the R field according to the present embodiment.

FIG. 4A shows an example of the relationship between the chromaticity r1 measured in the R field of the subframe and the target chromaticity OC. A dashed line in FIG. 4A shows an error range ER attributed to the characteristics and possible age deterioration of the LEDs forming the LED array 17.

That is, the dashed line in FIG. 4A shows the range of errors between the target chromaticity OC and the actual chromaticity r1 obtained when the LEDs actually lit at the light emission current values for the LEDs set such that the total chromaticity of the LEDs is equal to the target chromaticity. FIG. 4A shows that the actual measured chromaticity r1 falls within the error range ER.

Figure 4B:
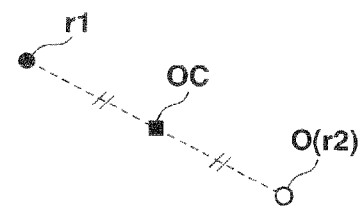

Based on the measurement results, as shown in FIG. 4B, CPU 27 calculates a position with which the measured chromaticity r1 has a point-symmetrical relationship with respect to the target chromaticity OC on the chromaticity space, to be a target chromaticity O(r2) for light emission in the R field of the next subframe.

If light can actually be emitted at the above-described target chromaticity O(r2) in the R field of the second subframe, an average chromaticity obtained by calculating an average of the total chromaticity in the R fields of the first and second subframes can be determined to be the target chromaticity OC. That is, by thus setting the chromaticity at which light is emitted in the R field of the second subframe, the error between the measured chromaticity in the R field of the first subframe and the target chromaticity OC can be offset.

On the other hand, even if light fails to be emitted at the target chromaticity O(r2) in the R field of the second subframe, the average chromaticity in the fields of the first and second subframes can be reliably made closer to the target chromaticity OC.

To achieve this, CPU 27 calculates such light emission current values for the color LEDs as enable the target chromaticity O(r2) calculated in the above-described step S101 to be achieved (step S108). CPU 27 then newly stores the calculated fight emission current values for the color LEDs in the chromaticity storage section 25*a* (step S109).

Then, CPU 27 re-sets the value of the variable (n), indicating the subframes, by adding one ("+1") to the value (step S110). Upon determining that the re-set value of the variable (n) does not exceed the number N of subframes in one frame as a whole (here, N is "3") (step S111), CPU 27 returns to the processing starting with the above-described step S101.

In step S101, CPU 27 determines whether or not the timing for the R field of the second subframe of the frame is reached. In the subsequent step S102, since the light emission current values for the LEDs are stored in the chromaticity storage section 25*a*, CPU 27 reads, from the chromaticity storage section 25*a*, the light emission current values for the LEDs newly stored in the chromaticity storage section 25*a* in the above-described step S109. CPU 27 uses the R driver 22, the G driver 23, and the B driver 24 to drive the LED array 17 at the read light emission current values so that the LED array 17 emits light.

In addition, in step S106, CPU 27 makes the illuminance sensors 26R, 26G, and 26B measure the brightness of the respective color components of the light source light. Then, in step S107, based on the measured brightness of the color components, CPU 27 calculates the total chromaticity in the R field of the second subframe.

Subsequently, based on the calculated total chromaticity in the second frame, CPU 27 calculates the average chromaticity in the R fields of the first and second subframes. Then, based on the differential value between the average chromaticity for the first and second frames and the target chromaticity, CPU 27 calculates a chromaticity for lighting in the R field of the next subframe.

Figure 4C:
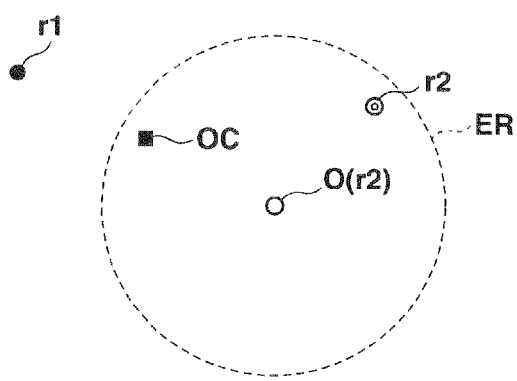

FIG. 4C shows an example of the relationship between the above-described target chromaticity O(r2) and the total chromaticity r2 actually measured in the R field of the second subframe. As shown by a dashed line in FIG. 4C, the actual measured chromaticity r2 falls within the error range E2, based on the target chromaticity O(r2) and attributed to the characteristics and possible age deterioration of the LEDs forming the LED array 17.

Figure 4D:
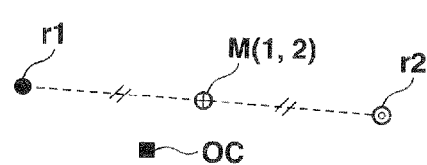
Figure 4E:
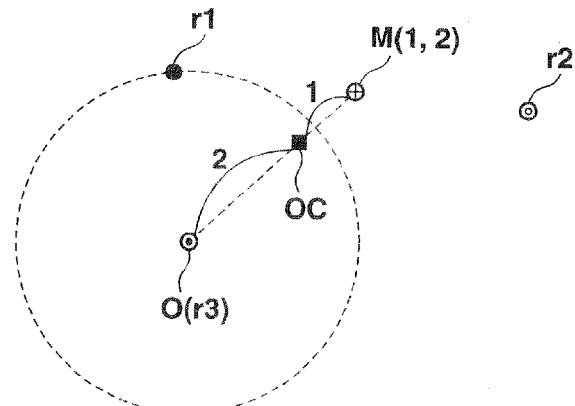
Figure 5:
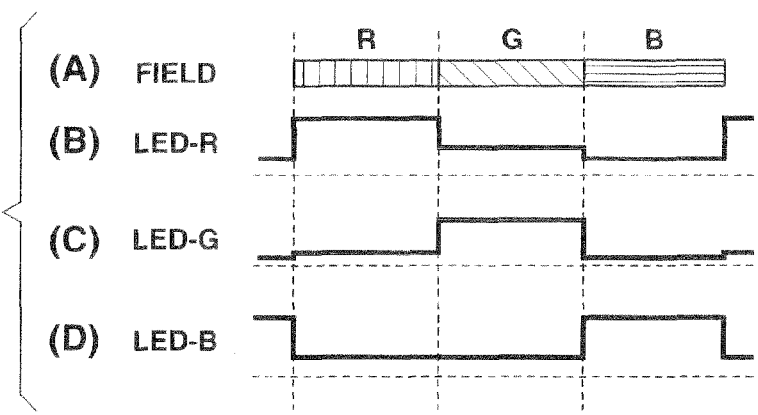
FIG. 5 is schematic diagram illustrating the emission luminance obtained when a data projector apparatus using LEDs as a light source according to the present embodiment simultaneously makes LEDs in a plurality of colors emit light.
Figure 6:
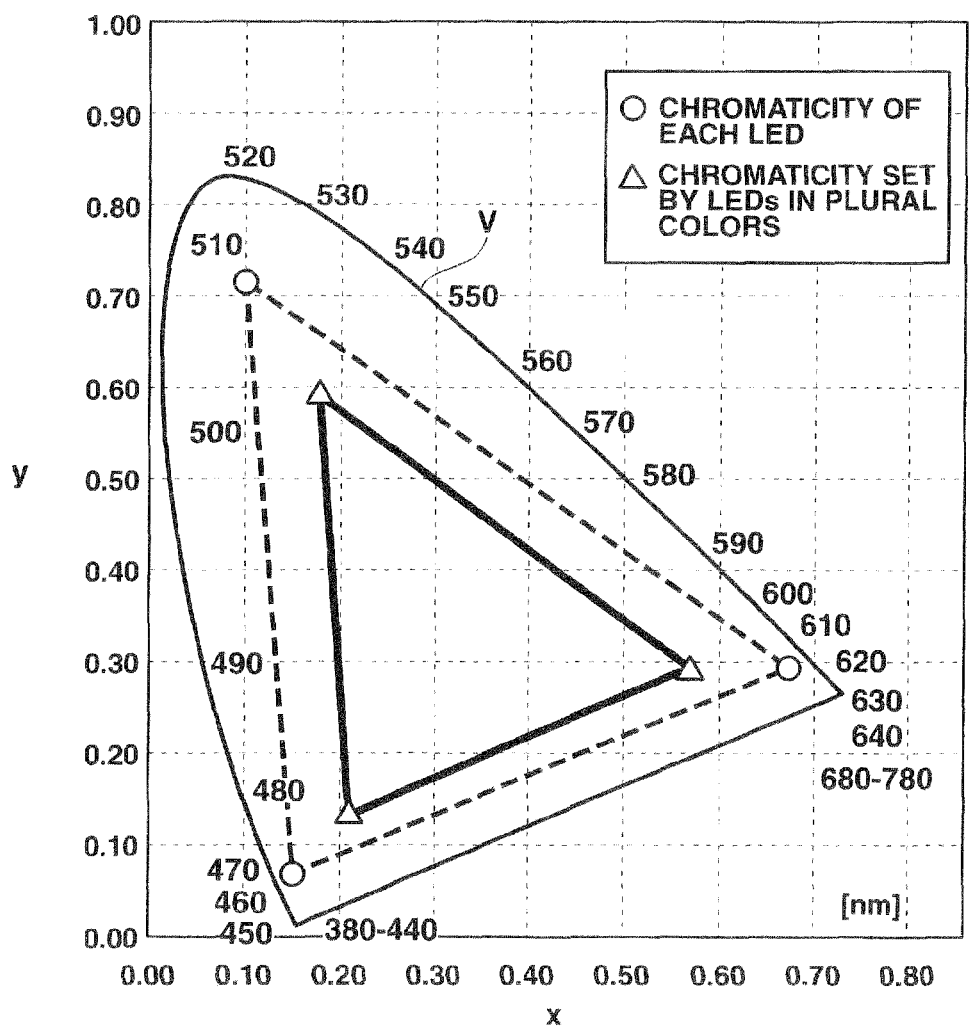
FIG. 6 is a CIExy chromaticity diagram illustrating a chromaticity set when the multicolor LEDs according to the present embodiment are simultaneously made to emit light and a chromaticity set when a single-color LED is made to emit light.

In connection with the measurement results, as shown in FIG. 4D, the middle point between the measured chromaticity r1 and the measured chromaticity r2 on the chromaticity space is defined as a chromaticity M(1, 2) corresponding to the sum of the above-described two measurement results. Then, based on the differential value between the above-described target chromaticity OC and the chromaticity M(1, 2) corresponding to the average chromaticity obtained by the actual lighting in the R fields of the first and second subframes, CPU 27 calculates a target chromaticity O(r3) for light emission from the R field of the next third subframe, as shown in FIG. 4E.

Here, the target chromaticity O(r3) is set at an object position such that when the distance to the above-described middle point M(1, 2) corresponding to the sum of the two chromaticities, between which the target chromaticity is positioned, is defined to be 1, the distance from the target chromaticity OC to the object position is "2".

If light can actually be emitted at the above-described target chromaticity O(r3) in the R field of the third subframe, the average chromaticity obtained by calculating an average of the total chromaticity in the R fields of the first to third subframes can be determined to be the target chromaticity OC.

That is, setting the chromaticity at which light is emitted in the R field of the third frame as described above allows offsetting of the error from the target chromaticity OC and the average chromaticity in the R fields of the first and second subframes.

On the other hand, even if light cannot actually be emitted at the above-described target chromaticity O(r3) in the R field of the third subframe, since the target chromaticity for the third subframe is set as described above with the error range ER of the LEDs taken into account, the average chromaticity for the R fields in one frame can be reliably made closer to the target chromaticity OC.

Then, CPU 27 calculates such light emission current values for the color LEDs as enable the target chromaticity O(r3) calculated in the above-described step S107 to be achieved (step 108). CPU 27 then newly stores the calculated light emission current values for the color LEDs in the chromaticity storage section 25a (step S109).

Then, CPU 27 re-sets the value of the variable (n), indicating the subframes, by adding one ("+1") to the value (step S110). Upon determining that the re-set value of the variable (n) does not exceed the number N of subframes in one frame as a whole, here, the value does not exceed "3" (step S111), CPU 27 returns to the processing starting with the above-described step S101.

In step S101, CPU 27 determines whether or not the timing for the R field of the third subframe of the frame is reached. In the subsequent step S102, CPU 27 determines that light emission current values for the LEDs are stored in the chromaticity storage section 25a. CPU 27 then proceeds to step S105. In step S105, CPU 27 reads the light emission current values for the LEDs newly stored in step S109, from the chromaticity storage section 25a. CPU 27 then uses the R driver 22, the G driver 23, and the B driver 24 to drive the LED array 17 at the read light emission current values so that the LED array 17 emits light.

In addition, in step S106, CPU 27 makes the illuminance sensors 26R, 26G, and 26B measure the brightness of the respective color components of the light source light. Then, in step S107, based on the measured bright of the color components, CPU 27 calculates the total chromaticity in the R field of the third subframe. Based on the calculated total chromaticity in the third frame, CPU 27 calculates the average chromaticity in the R fields of the first to third subframes. Then, based on the differential value between the average chromaticity for the first and second frames and the target chromaticity, CPU 27 calculates a chromaticity in the R field of the next subframe.

Then, CPU 27 calculates such light emission current values for the color LEDs as enable the calculated target chromaticity to be achieved (step S108). CPU 27 then newly stores the calculated light emission current values for the color LEDs in the chromaticity storage section 25a (step S109).

Then, CPU 27 re-sets the value of the variable (n), indicating the subframes, to "4" by adding one ("+1") to the value (step S110). In the subsequent step S111, upon determining that the re-set value "4" of the variable (n) exceeds the number "3" of subframes in one frame as a whole (step S111), CPU 27 sets the variable (n) to the initial value "1" (step S112). CPU 27 returns to the processing starting with the above-described step S101 again.

Thus, a red optical image is formed using red light the chromaticity of which has been adjusted based on the plurality of R fields in one image frame. The optical image is then projected.

Similar operations are performed on each of the G and B fields as described above. As a result, the LED array 17 is driven so as to emit light at the chromaticity correctly adjusted in all of the R, G, and B fields. Thus, a projection operation is performed.

Furthermore, predetermined values for the target chromaticity for the R, G, and B fields, respectively, are stored before shipment. Alternatively, the values may be changed as needed. That is, a plurality of selectable projection modes such as a luminance mode and a chromaticity mode are prepared for the projector apparatus 10. Then, if for example, the luminance mode is selected, the quantity of light emission in all the fields other than a particular one is increased. For example, in the R field, the quantity of light emission from LED-G and LED-B, that is, all the LEDs other than LED-R to be originally lit is increased. The total chromaticity for the LEDs for which the quantity of light emission has been adjusted is thus set to be a new target chromaticity.

If the target chromaticity is thus changed, the light emission current values for the LEDs stored in the chromaticity storage section 25a are reset. The processing shown in FIG. 3 is then executed again based on the new target chromaticity.

As described above, the present embodiment enables the chromaticity of the light source light according to the field-sequential scheme to be accurately maintained at the set content.

In addition, the above-described embodiment utilizes the content stored in the chromaticity storage section 25a for the subsequent frames. This allows convergence of a variation in the luminance of the individual LEDs forming the LED array 17 which variation is caused by a variation in temperature, age deterioration, or the like. As a result, the chromaticity of the light source light can be more accurately maintained.

Although not shown in the above-described embodiment, when for each subframe, a target chromaticity for the next subframe is calculated, a specific, limited adjustment range may be set based on the target luminance to be achieved for the entire frame.

In this case, by limiting the range of a variation in chromaticity between the adjacent subframes to a given value, the luminance of the light source can be prevented from varying significantly. Thus, since human eyes are more sensitive to a variation in brightness than to colors, projected images can be prevented from being degraded.

Furthermore, in the above-described embodiment, unless the target chromaticity is changed, the light emission current values for the LEDs are sequentially adjusted so that the average chromaticity from the first subframe is set to be the target chromaticity. However, an increase in the period over which the average chromaticity is calculated may prevent the average chromaticity from being perceived depending on the human (user's) color identification ability. Thus, even though the LED current values are adjusted so that the average chromaticity is set to be the target chromaticity, a chromaticity different from the target chromaticity may be perceived.

To solve this problem, it is possible to reset the light emission current values for the LEDs newly stored in the chromaticity storage section 25a in every predetermined period (for example, every frame). That is, the processing shown in FIG. 3 described above is re-executed every predetermined period.

The predetermined time is preferably set based on the human (user's) color identification ability.

In this case, the light emission current values for the LEDs adjusted during the first, above-described predetermined period may be used during the next predetermined period without change. Thus, unless the target chromaticity itself is changed, the light emission current values for the LEDs adjusted during the first predetermined period can be used for the subsequent light emission. As a result, the processing can be simplified, with the chromaticity of the light source light maintained at the appropriate value.

Furthermore, in the above-described embodiment, as shown in FIG. 1, the illuminance sensors 26R, 26G, and 26B are arranged near the LED light source in order to measure the luminance of the LED light source. However, the present invention is not limited to this configuration. The illuminance sensors may be arranged near and over a regular optical path from the LED light source in order to measure leakage light from the regular optical path. Alternatively, part of the light over the regular optical path may be reflected to the sensor side as light to be measured. Moreover, the illuminance sensors may be arranged in front of the projector in order to measure the illuminance of irradiation light projected on the screen. In any way, it is only necessary to measure the brightness of light emitted by the LED light source in each color.

Additionally, in the above-described embodiment, in each of the R, G, and B fields, the R, G, and B LEDs forming the LED array 17 simultaneously emit light. However, the present invention is not limited to this configuration. The present invention is also applicable to the case where in each field, only the LED with the corresponding color emits light.

Moreover, in the above-described embodiment, LEDs are used as light emitting elements for a light source. However, the present invention is not limited to this configuration. The present invention is also effective for a projection apparatus according to the field-sequential scheme which uses a different light source, for example, a light source irradiating a phosphor with laser light to excite light source light in R, G, and B.

Furthermore, in the above-described embodiment, as shown in FIG. 2, one frame is divided into three subframes; first to third subframes. However, the present invention is not limited to this configuration. One frame may be divided into any number of subframes provided that the number is at least two. That is, as described above, an increase in the number of subframes allows the error range of the LED light source to be adjustably reduced.

Moreover, in the above-described embodiment, even though currents with values adjusted for the target chromaticity are passed, the error range ER results from the characteristics and possible aged deterioration of the LEDs forming the LED array 17. However, obviously, the error range ER does not have a fixed value and varies depending on the individual differences among the LEDs, and the situation and environment in which the LEDs are used. Thus, for example, the measurement error range may be corrected every given period, or different measurement error values may be set for the respective LEDs.

Furthermore, the present invention is not limited to the above-described embodiments. In practice, many variations may be made to the embodiments without departing from the spirit of the present invention. Additionally, the functions executed in the above-described embodiments may be appropriately combined together if at all possible. The above-described embodiments include various stages. A plurality of the disclosed compositions may be appropriately combined together to allow various inventions to be extracted. For example, if the present invention is still effective after some of the components shown in the embodiments have been removed, the configuration resulting from the removal of these components can be extracted as an invention.

Furthermore, the present invention is not limited to the above-described embodiments. The embodiments can be freely changed or modified without departing from the spirit of the present invention.

Various typical embodiments have been shown and described. However, the present invention is not limited to the embodiments. Therefore, the scope of the present invention is limited only by the claims.

What is claimed is:

1. A projection apparatus comprising:
   a plurality of light sources individually emitting light in a plurality of colors;
   a projection section using light from the light sources to generate images corresponding to respective plural color components of the light source light for each period, to sequentially project the images;
   a measurement section measuring a brightness of the light sources for each of the plurality of colors at an image projection term at which the projection section projects an image of each of the plural color components;
   an average brightness calculation section calculating, at each image projection term for a same color component, an average brightness of the brightness measured by the measurement section at the image projection term; and
   a light source control section adjusting the brightness of the light sources so that an average chromaticity based on the average brightness calculated by the average brightness calculation section and indicating the brightness is equal or approximate to a target chromaticity;
   wherein the average brightness calculation section repeats, every one frame period in which one image is generated, the operation of calculating, at each image projection term for the same color component, the average brightness of the brightness measured by the measurement section at the image projection term;
   wherein the projection section divides one frame corresponding to the one frame period into a plurality of subframes, uses the subframes as one period to generate images corresponding to the respective plural color components of the light source light, and sequentially projects the images; and
   wherein the light source control section adjusts the brightness of the light sources for each of the subframes so that a calculated chromaticity based on the average brightness calculated by the average brightness calculation section and indicating the brightness is equal or approximate to the target chromaticity.

2. The projection apparatus according to claim 1, wherein the light source control section adjusts the brightness of the light sources made to emit light at the image projection term for the same color component so that the average chromaticity based on the average brightness calculated by the average brightness calculation section and indicating the brightness is equal or approximate to the target chromaticity.

3. The projection apparatus according to claim 1, further comprising a storage section storing a content of the adjustment of the brightness of the light sources performed by the light source control section;
   wherein the light source control section uses the content of the adjustment stored in the storage section to adjust the brightness of the light sources at subsequent image projection terms for the same color component.

4. The projection apparatus according to claim 1, wherein the light source control section calculates the brightness of the light sources and adjusts driving current values for the light sources based on the calculated brightness.

5. The projection apparatus according to claim 1, wherein at each image projection term for each of the plurality of color components, the projection section allows light with color components other than the color component corresponding to the image projection term to simultaneously emit light at a luminance lower than a rated value.

6. The projection apparatus according to claim 1, wherein the measurement section measures a brightness of an image projected on a screen.

7. The projection apparatus according to claim 1, wherein the target chromaticity is set to a predetermined value before shipment and is optionally changeable.

8. The projection apparatus according to claim 1, wherein the light source control section adjusts the brightness of the light sources within a predetermined chromaticity range based on the target chromaticity.

9. The projection apparatus according to claim 1, wherein the light sources comprise LEDs.

10. A projection method using a projection apparatus comprising a plurality of light sources individually emitting light in a plurality of colors, and a projection section using light from the light sources to generate images corresponding to respective plural color components of the light source light for each period, to sequentially project the images, the method comprising:
    measuring a brightness of the light sources for each of the plurality of colors at a term at which the projection section projects an image of each of the plural color components;
    calculating, at each image projection term for a same color component, an average brightness of the measured brightness at the image projection term; and
    adjusting the brightness of the light sources so that an average chromaticity based on the calculated average brightness and indicating the brightness is equal or approximate to a target chromaticity
    wherein the calculating the average brightness of the measured brightness at the image projection term is repeated every one frame period in which one image is generated, at each image projection term for the same color component;
    wherein the projection section divides one frame corresponding to the one frame period into a plurality of subframes, uses the subframes as one period to generate images corresponding to the respective plural color components of the light source light, and sequentially projects the images; and
    wherein the adjusting adjusts the brightness of the light sources for each of the subframes so that a calculated chromaticity based on the calculated average brightness and indicating the brightness is equal or approximate to the target chromaticity.

11. The projection method according to claim 10, wherein the adjusting adjusts the brightness of the light sources made to emit light at the image projection term for the same color component so that the average chromaticity based on the calculated average brightness and indicating the brightness is equal or approximate to the target chromaticity.

12. A non-transitory computer readable storage medium having a program stored thereon which is executable by a computer incorporated in a projection apparatus comprising a plurality of light sources individually emitting light in a plurality of colors, and a projection section using light from the light sources to generate images corresponding to respective plural color components of the light source light for each period, to sequentially project the images, the program controlling the computer to execute functions comprising: measuring a brightness of the light sources for each of the plurality of colors at a term at which the projection section projects an image of each of the plural color components; calculating, at each image projection term for a same color component, an average brightness of the measured brightness at the image projection term; and adjusting the brightness of the light sources so that an average chromaticity based on the calculated average brightness and indicating the brightness is equal or approximate to a target chromaticity; wherein the calculating the average brightness of the measured brightness at the image projection term is repeated every one frame period in which one image is generated, at each image projection term for the same color component; wherein the projection section divides one frame corresponding to the one frame period into a plurality of subframes, uses the subframes as one period to generate images corresponding to the respective plural color components of the light source light, and sequentially projects the images; and wherein the adjusting adjusts the brightness of the light sources for each of the subframes so that a calculated chromaticity based on the calculated average brightness and indicating the brightness is equal or approximate to the target chromaticity.

13. The program according to claim 12, wherein the adjusting adjusts the brightness of the light sources made to emit light at the image projection term for the same color component so that the average chromaticity based on the calculated average brightness and indicating the brightness is equal or approximate to the target chromaticity.

* * * * *